United States Patent [19]
Abe

[11] Patent Number: 5,731,912
[45] Date of Patent: Mar. 24, 1998

[54] PHOTOGRAPHING LENS

[75] Inventor: Tetsuya Abe, Hokkaido, Japan

[73] Assignee: Asahi Kogaku Kogyo Kabushiki Kaisha, Tokyo, Japan

[21] Appl. No.: 745,467

[22] Filed: Nov. 12, 1996

[30] Foreign Application Priority Data

Nov. 10, 1995 [JP] Japan .................. 7-293009

[51] Int. Cl.$^6$ .................. G02B 15/14; G02B 9/04
[52] U.S. Cl. .................. 359/691; 359/740; 359/793
[58] Field of Search .................. 359/793, 740, 359/691

[56] References Cited

U.S. PATENT DOCUMENTS 4,818,081  4/1989  Ito ................ 359/691
5,280,390  1/1994  Ito ................ 359/691
5,546,232  8/1996  Hirakawa ......... 359/691

Primary Examiner—David C. Nelms
Assistant Examiner—Evelyn A. Lester
Attorney, Agent, or Firm—Greenblum & Bernstein, P.L.C.

[57] ABSTRACT

A photographing lens includes a negative first lens group, a diaphragm, and a positive second lens group, in this order from the object side. The photographing lens satisfies the following relationships: $-0.7 < f/f_1 < -0.2$, $0.7 < L/f$ $1.5$, and $0.3 < d/f < 0.6$. In the relationships, "f" represents the focal length of the entire optical system of the photographing lens, "$f_1$" the focal length of the first lens group, "L" the distance from the last surface of the first lens group to the first surface of the second lens group, and "d" the distance from the first surface of the first lens group to the last surface of the first lens group, respectively.

3 Claims, 5 Drawing Sheets

PHOTOGRAPHING LENS

BACKGROUND OF THE INVENTION

1. Field of the Invention

The present invention relates to a photographing lens for a small CCD camera or the like.

2. Description of the Related Art

A high definition CCD elements having smaller picture sizes have been developed due to progress in CCD manufacturing technology. In this connection, there is a need for realization of a photographing lens for a CCD camera, having a high resolution and a short focal length.

There is a limitation to miniaturization (reduction of thickness) of an optical element (filter, etc.) such as a low-pass filter or an infrared radiation cutting filter, provided in a space defined between the photographing lens and the CCD in view of the optical properties thereof.

A photographing lens of a conventional camera is conventionally a triplet type lens, a Tessar type lens, or a Gauss type lens. In these types of lenses, the back focal distance is relatively small with respect to the focal length. Consequently, an attempt to miniaturize the CCD element or reduce the focal length of the photographing lens in accordance therewith makes it difficult to provide an accommodation space for the optical elements including the filters in the camera.

SUMMARY OF THE INVENTION

It is an object of the present invention to provide a photographing lens whose F-number is approximately 2.8 and which exhibits an appropriate optical property for the half angle of view of approximately 25° and which has a back focal distance longer than the focal length.

According to the present invention, there is provided a photographing lens comprising a negative first lens group, a diaphragm, and a positive second lens group, in this order from the object side, wherein the lens satisfies the following relationships (1) through (3);

$$-0.7 < f/f_I < -0.2 \tag{1}$$

$$0.7 < L/f < 1.5 \tag{2}$$

$$0.3 < d/f < 0.6 \tag{3}$$

wherein

- f represents the focal length of the entire optical system,
- $f_I$ represents the focal length of the first lens group,
- L represents the distance from the last surface of the first lens group to the first surface of the second lens group, and
- d represents the distance from the first surface of the first lens group to the last surface of the first lens group.

The first lens group can for example, comprise a positive lens element whose surface is located on the object side is a convex surface and a negative lens element whose surface located on the image side is a concave surface, arranged in this order from the object side, and wherein the first lens group satisfies the following relationships;

$$0.3 < r_{I-L}/f < 0.6 \tag{4}$$

$$0.15 < f/f_{I-1} < 0.5 \tag{5}$$

$$n_{I-2} > 1.6 \tag{6}$$

wherein

- $r_{I-L}$ represents the radius of curvature of the surface of the negative lens element located on the image side,
- $f_{I-1}$ represents the focal length of the positive lens element, and
- $n_{I-2}$ represents the refractive index of the negative lens element at the d-line.

The second lens group can, for example, be a cemented lens assembly of negative and positive lens elements and a biconvex lens in this order from the object side and satisfies the following relationships (7);

$$n_{II-1} > 1.7 \tag{7}$$

wherein $n_{II-1}$ represents the refractive index of the negative lens element of the second lens group at the d-line.

The present disclosure relates to subject matter contained in Japanese patent application No. 7-293009 (filed on Nov. 10, 1995) which is expressly incorporated herein by reference in its entirety.

BRIEF DESCRIPTION OF THE DRAWINGS

The invention will be described below in detail with reference to the attached drawings, in which.

DESCRIPTION OF THE PREFERRED EMBODIMENTS

Figure 1:
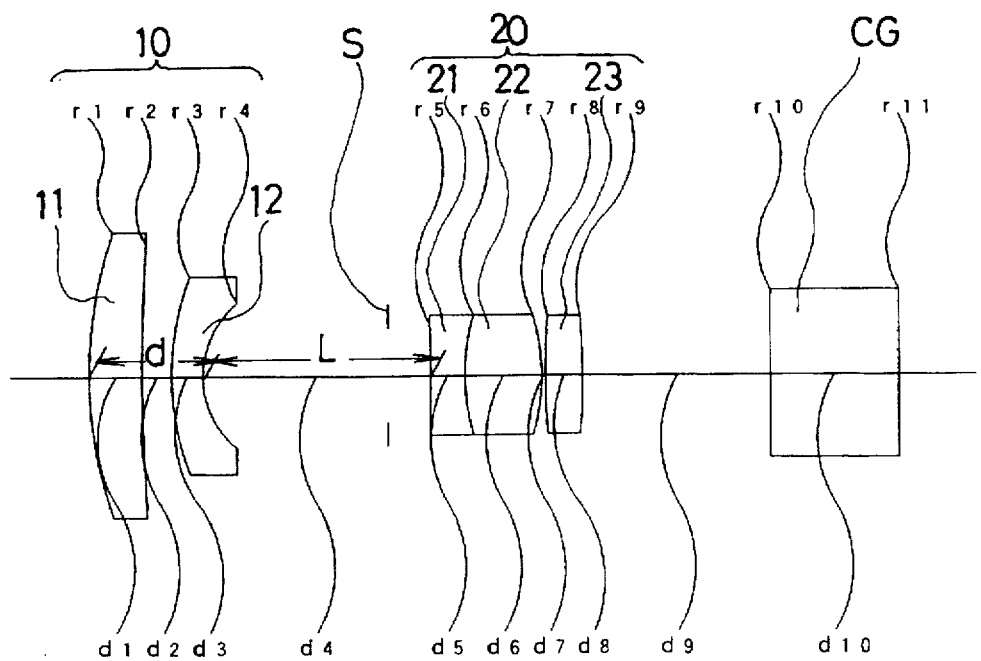
FIG. 1 is a schematic view of a lens arrangement of a photographing lens according to a first embodiment of the present invention.
Figures 2A, 2B, 2C, 2D, 2E:
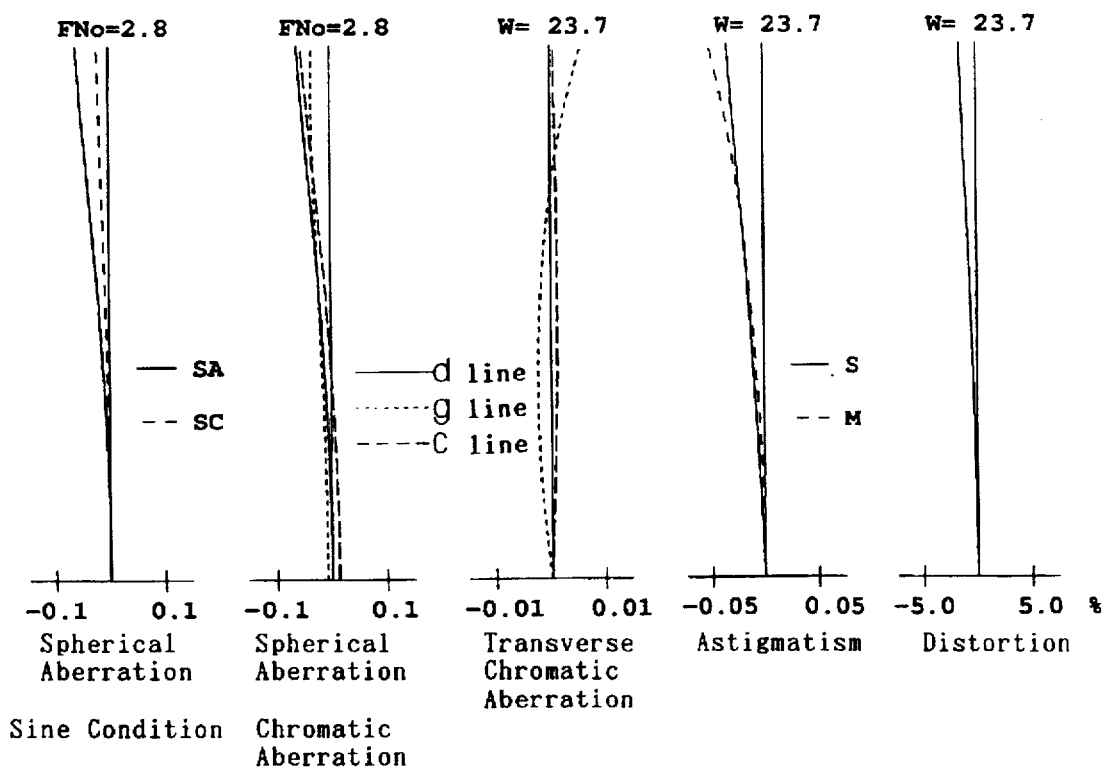
FIGS. 2A, 2B, 2C, 2D and 2E are aberration diagrams of a lens system shown in FIG. 1.

According to the basic concept of the present invention, a conventional retrofocus type lens which is used for a conventional wide-angle lens and has a standard half angle of view to obtain a long back focal distance relative to the focal length is employed. The present invention is addressed to the lens arrangement and the power distribution of the lens groups so that a retrofocus type photographing lens which is smaller and lighter than conventional photographing lenses can be provided.

Relationship (1) specifies the requirement of the focal length of the first lens group having a negative power to obtain a sufficient back focal distance and provide an appropriate optical property. If the ratio defined in relationship (1) exceeds the upper limit, the negative power of the first lens group is too small to increase the back focal distance. If the ratio is below the lower limit, the negative power of the first lens group is so strong that excessive negative spherical aberrations or comatic aberrations occur, thus resulting in an inappropriate optical property.

Relationship (2) specifies the distance between the first lens group and the second lens group. When the photographing lens meets the requirements specified by relationship (2), not only can an accommodation space in which the diaphragm mechanism is incorporated be provided, but also the diameter of the first lens group can be reduced.

If the ratio defined in formula (2) is above the upper limit, the diameter of the first lens group is so large that the manufacturing cost is extremely high. If the ratio is below the lower limit, the distance between the first and second lens groups is too small to incorporate the diaphragm mechanism therebetween.

In the photographing lens according to the present invention, since the first lens group has a relatively strong negative power as specified in relationship (1), negative distortion and comatic aberration occur. To obtain an appropriate optical property, the first lens group preferably comprises of a positive lens element and a negative lens element so that the negative aberrations can be cancelled due to the convergence function of the positive lens element. However, since the first lens group has a strong negative power as mentioned above, it is impossible for the positive lens element of the first lens group to have a strong power, and hence sufficient convergence can not be achieved.

Instead of provisioning a strong power to the positive lens element of the first lens group, if the positive lens element of the first lens group is spaced from the negative lens element thereof, a difference in the height of the incident point of the off-axis rays between the positive lens element and the negative lens element can be increased. However, the diameter of the first lens element of the first lens group is increased as the distance between the positive and negative lens elements is increased.

Relationship (3) specifies the requirement to effectively correct the negative distortion and comatic aberration and reduce the diameter of the first lens of the first lens group by appropriately setting the whole length of the first lens group. If the ratio defined in relationship (3) is above the upper limit, the diameter of the first lens of the first lens group is so large that the photographing lens cannot be miniaturized or the manufacturing cost is increased. If the ratio is below the lower limit in relationship (3), the positive lens element of the first lens group is too close to the negative lens element thereof, and hence the difference in the height of the incident point of the off-axis rays between the positive lens element and the negative lens element becomes small. Thus, it is difficult to correct the negative distortion or comatic aberration produced in the first lens group.

Relationship (4) specifies the radius of curvature of the last surface of the first lens group. If the last surface of the first lens group is a divergent surface having a relatively small radius of curvature so that the divergence function chiefly relies upon the rear portion of the first lens group, the difference in the height of the incident point of the off-axis rays between the positive lens element and the negative lens element can be synergistically increased by the requirements defined in relationship (3) as well as relationship (4). Thus, the distortion and the comatic aberration can be effectively corrected.

If the ratio defined in relationship (4) is above the upper limit, the divergency of the last surface of the first lens group is too weak to increase the difference in the height of the incident point of the off-axis rays between the positive and negative lens elements of the first lens group. Consequently, negative distortion or comatic aberration cannot be corrected. If the ratio is smaller than the lower limit in relationship (4), the divergence properties of the last surface of the first lens group is so strong that a large amount of distortion or comatic aberration occurs.

Relationship (5) specifies the power of the first positive lens element of the first negative lens group. As mentioned above, it is preferable that the positive lens element of the first lens group has a strong power from the viewpoint of aberration correction. However, if the positive power is so strong that the ratio in relationship (5) is larger than the upper limit, it is necessary to increase the negative power of the second lens element in order to obtain the negative power of the first lens group that meets the requirement defined in relationship (1), thus resulting in an excess amount of high-order spherical aberration or comatic aberration. If the positive power of the first lens element is so weak that the ratio is smaller than the lower limit in relationship (5), it becomes difficult to reduce or cancel the negative distortion or comatic aberration produced in the first lens group.

In the photographing lens according to the present invention, the Petzval sum tends to increase in the negative direction since the negative power of the first lens group is strong, as mentioned above. Relationship (6) specifies the requirement to restrict the Petval sum and the distortion by increasing the refractive index of the negative lens element of the first lens group having a strong negative power. If the refractive index is smaller than the lower limit in the relationship (6), the Petzval sum increases in the negative direction, and hence it becomes difficult to restrict the distortion.

Relationship (7) specifies the refractive index of the negative lens element of the second lens group. As in relationship (6), the distortion can be restricted by increasing the refractive index of the negative lens element of the second lens group. If the refractive index is smaller than the lower limit, it becomes difficult to restrict the distortion.

Five embodiments (numerical examples) of the present invention will be discussed below. In the five embodiments, the photographing lens is comprised of a negative first lens group 10, a diaphragm S, and a positive second lens group 20, in this order from the object side. The first lens group 10 comprises a positive lens element 11 having a convex surface located on the object side and a negative lens element 12 having a concave surface located on the image side, in this order from the object side. The second lens group comprises a cemented lens assembly of a negative lens element 21 and a positive lens element 22 cemented thereto, and a biconvex lens element 23, in this order from the object side. There is a glass cover CG of the CCD located behind the second lens group 20. The surface (r11) of the glass cover CG located on the image side defines an image pickup surface of the CCD.

<Embodiment 1>

FIG. 1 shows a first embodiment of an optical system of a photographing lens according to the present invention. FIGS. 2A through 2E are diagrams of various aberrations of the optical system shown in FIG. 1. Numerical data of the lens system in the first embodiment is shown in Table 1 below.

In the aberration diagrams, "SA" designates the spherical aberration, "SC" the sine condition, "d-line", "G-line", and "C-line" the chromatic aberrations represented by the spherical aberrations and transverse chromatic aberrations, at the respective wavelengths, "S" the Sagittal rays, and "M" the Meridional rays, respectively.

In the following tables and drawings, "$F_{NO}$" designates the F-number representative of an aperture size, "f" the focal length, "W" the half angle of view, "$f_B$" the back focal distance, "R" the radius of curvature, "D" the thickness of a lens or the distance between lenses "$N_d$" the refractive index of the d-line and "$v_d$" the Abbe number of the d-line, respectively. Note that the back focal distance $f_B$ is a reduced distance from the last surface (r9) of the second lens group to the surface (r11) of the glass cover CG that is located on the image side ($f_B = D_9 + (D_{10}/N_{10})$).

TABLE 1

$F_{NO} = 1:2.8$
$f = 5.24$
$W = 23.7$
$f_B = 8.20$

| surface No. | R | D | $N_d$ | $v_d$ |
|---|---|---|---|---|
| 1 | 12.000 | 1.30 | 1.80518 | 25.4 |
| 2 | 47.974 | 0.77 | — | — |
| 3 | 7.040 | 0.80 | 1.69680 | 55.5 |
| 4 | 2.500 | 4.72 | — | — |
| diaphragm | ∞ | 1.10 | — | — |
| 5 | −39.999 | 0.90 | 1.84666 | 23.8 |
| 6 | 5.507 | 2.00 | 1.72000 | 50.2 |
| 7 | −5.507 | 0.10 | — | — |
| 8 | 19.920 | 1.00 | 1.83481 | 42.7 |
| 9 | −19.920 | 5.98 | — | — |
| 10 | ∞ | 3.32 | 1.49782 | 66.8 |
| 11 | ∞ | — | — | — |

<Embodiment 2>

Figure 3:
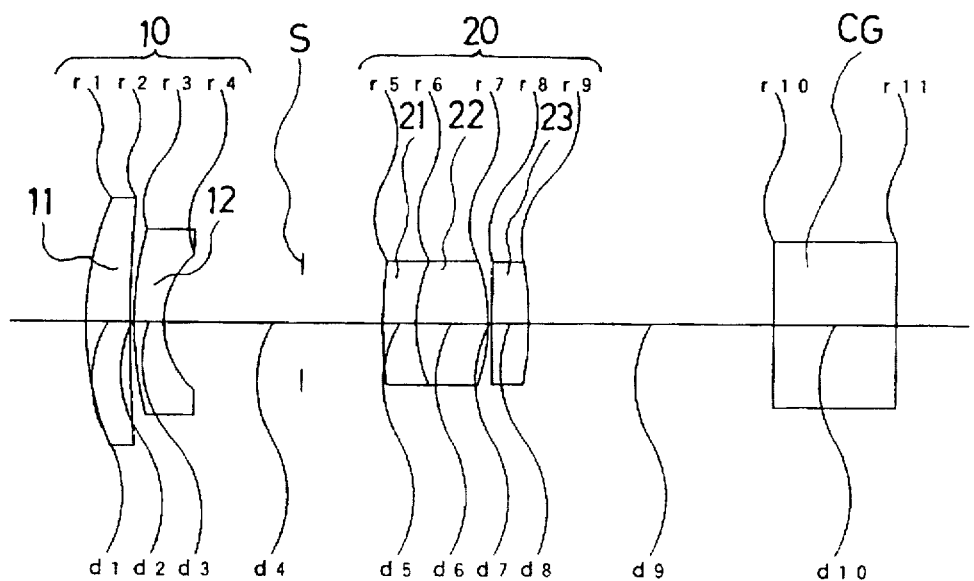
FIG. 3 is a schematic view of a lens arrangement of a photographing lens according to a second embodiment of the present invention.
Figures 4A, 4B, 4C, 4D, 4E:
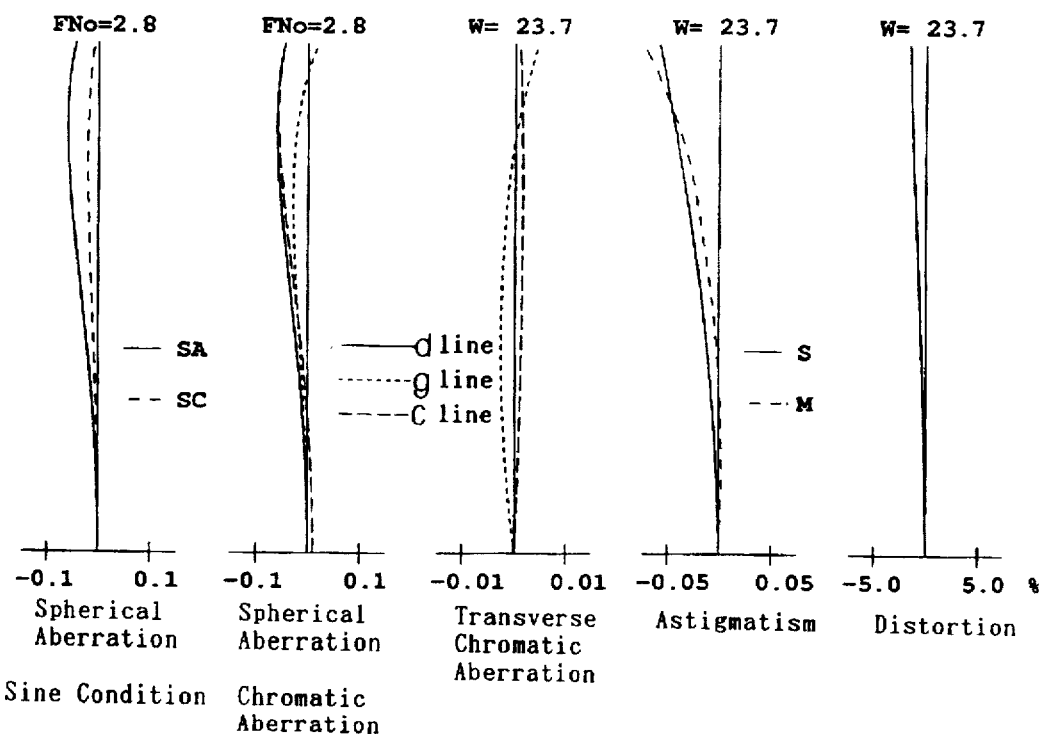
FIGS. 4A, 4B, 4C, 4D and 4E are aberration diagrams of a lens system shown in FIG. 3.

FIG. 3 shows a second embodiment of a lens arrangement of a photographing lens according to the present invention. FIGS. 4A through 4E are diagrams of various aberrations in the optical system shown in FIG. 3. Numerical data in the second embodiment is shown in Table 2 below.

TABLE 2

$F_{NO} = 1:2.8$
$f = 5.24$
$W = 23.7$
$f_B = 8.89$

| surface No. | R | D | $N_d$ | $v_d$ |
|---|---|---|---|---|
| 1 | 9.008 | 1.20 | 1.80518 | 25.4 |
| 2 | 46.311 | 0.10 | — | — |
| 3 | 9.790 | 0.80 | 1.77250 | 49.6 |
| 4 | 2.500 | 3.75 | — | — |
| diaphragm | ∞ | 2.18 | — | — |
| 5 | 13.677 | 0.90 | 1.80518 | 25.4 |
| 6 | 4.100 | 2.00 | 1.56883 | 56.3 |
| 7 | −5.175 | 0.10 | — | — |
| 8 | 91.640 | 1.00 | 1.65160 | 58.5 |
| 9 | −10.447 | 6.67 | — | — |
| 10 | ∞ | 3.32 | 1.49782 | 66.8 |
| 11 | ∞ | — | — | — |

<Embodiment 3>

Figure 5:
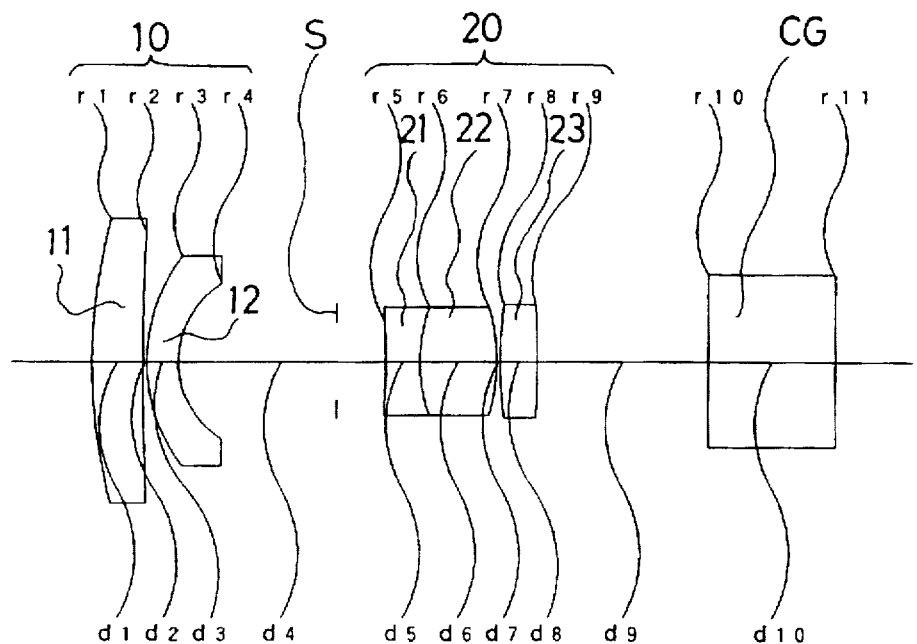
FIG. 5 is a schematic view of a lens arrangement of a photographing lens according to a third embodiment of the present invention.
Figures 6A, 6B, 6C, 6D, 6E:
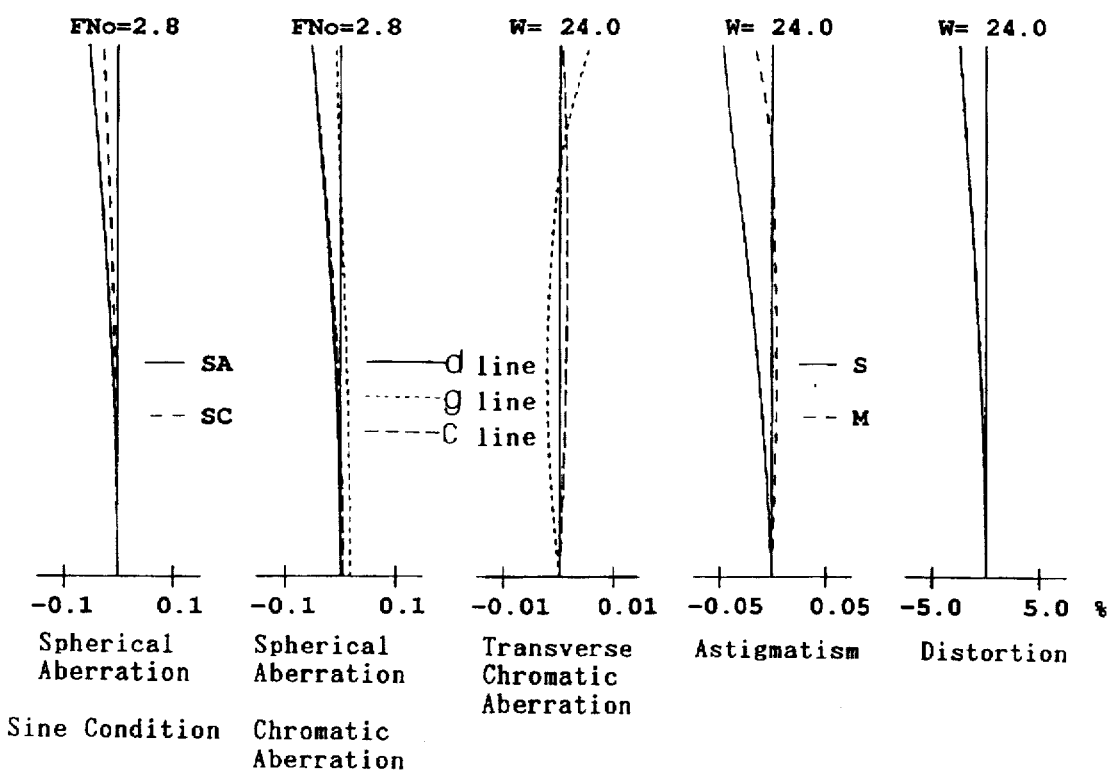
FIGS. 6A, 6B, 6C, 6D and 6E are aberration diagrams of a lens system shown in FIG. 5.

FIG. 5 shows a third embodiment of an optical system of a photographing lens according to the present invention. FIGS. 6A through 6E are diagrams of various aberrations in the optical system shown in FIG. 5. Numerical data in the third embodiment is shown in Table 3 below.

TABLE 3

$F_{NO} = 1:2.8$
$f = 5.24$
$W = 24.0$
$f_B = 6.72$

| surface No. | R | D | $N_d$ | $v_d$ |
|---|---|---|---|---|
| 1 | 14.820 | 1.30 | 1.80518 | 25.4 |
| 2 | 70.870 | 0.10 | — | — |
| 3 | 4.707 | 0.80 | 1.65160 | 58.5 |
| 4 | 2.500 | 4.06 | — | — |
| diaphragm | ∞ | 1.26 | — | — |
| 5 | −11.780 | 0.90 | 1.80518 | 25.4 |
| 6 | 4.194 | 2.00 | 1.75700 | 47.8 |
| 7 | −5.175 | 0.10 | — | — |
| 8 | 12.000 | 1.00 | 1.80400 | 46.6 |
| 9 | −24.520 | 4.51 | — | — |
| 10 | ∞ | 3.32 | 1.49782 | 66.8 |
| 11 | ∞ | — | — | — |

<Embodiment 4>

Figure 7:
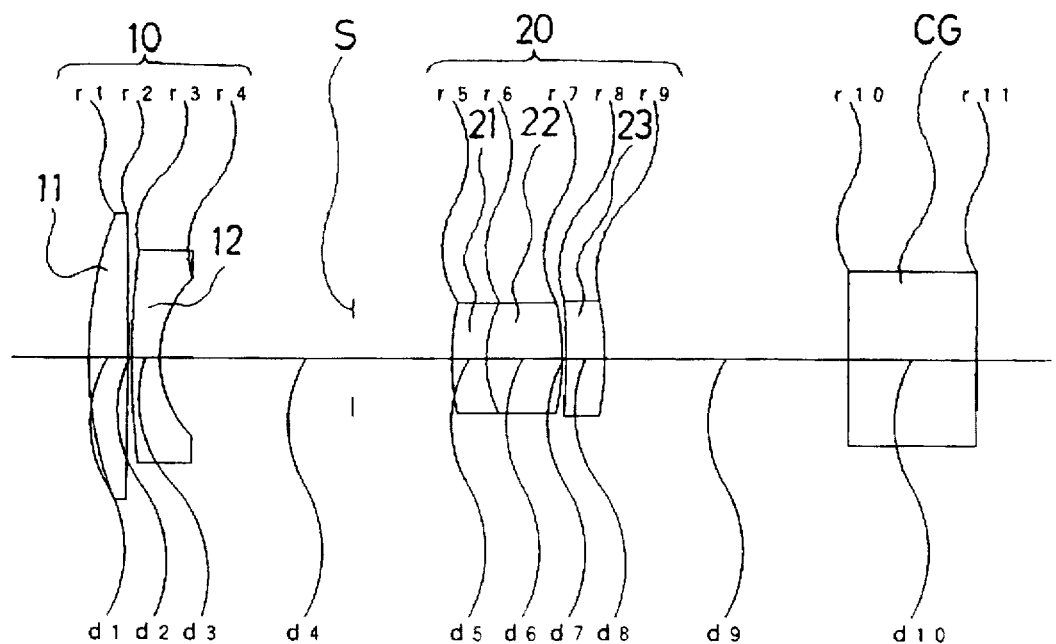
FIG. 7 is a schematic view of a lens arrangement of a photographing lens according to a fourth embodiment of the present invention.
Figures 8A, 8B, 8C, 8D, 8E:
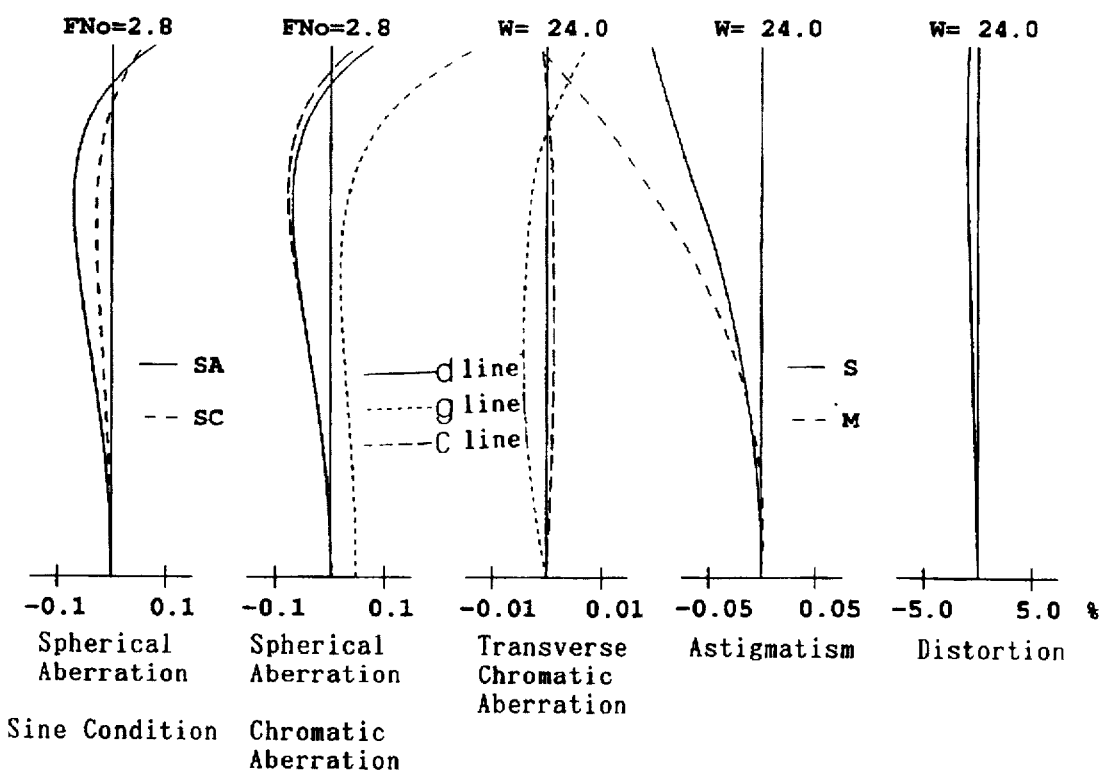
FIGS. 8A, 8B, 8C, 8D and 8E are aberration diagrams of a lens system shown in FIG. 7.

FIG. 7 shows a fourth embodiment of an optical system of a photographing lens according to the present invention. FIGS. 8A through 8E are diagrams of various aberrations in the optical system shown in FIG. 7. Numerical data in the fourth embodiment is shown in Table 4 below.

TABLE 4

$F_{NO} = 1:2.8$
$f = 5.22$
$W = 24.0$
$f_B = 9.56$

| surface No. | R | D | $N_d$ | $v_d$ |
|---|---|---|---|---|
| 1 | 10.763 | 1.00 | 1.80518 | 25.4 |
| 2 | −358.102 | 0.10 | — | — |
| 3 | 22.835 | 0.70 | 1.77250 | 49.6 |
| 4 | 3.000 | 5.00 | — | — |
| diaphragm | ∞ | 2.54 | — | — |
| 5 | 7.026 | 0.90 | 1.80518 | 25.4 |
| 6 | 3.123 | 2.00 | 1.56883 | 56.3 |
| 7 | −6.834 | 0.10 | — | — |
| 8 | −19.285 | 1.00 | 1.65160 | 58.5 |
| 9 | −8.040 | 7.34 | — | — |
| 10 | ∞ | 3.32 | 1.49782 | 66.8 |
| 11 | ∞ | — | — | — |

<Embodiment 5>

Figure 9:
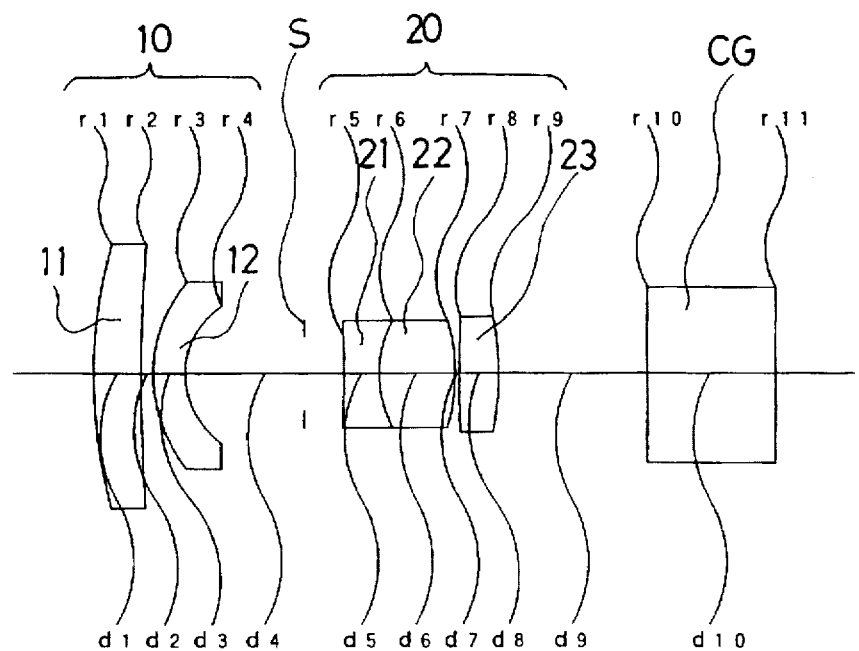
FIG. 9 is a schematic view of a lens arrangement of a photographing lens according to a fifth embodiment of the present invention; and, FIGS. 10A, 10B, 10C, 10D and 10E are aberration diagrams of a lens system shown in FIG. 9.
Figures 10A, 10B, 10C, 10D, 10E:
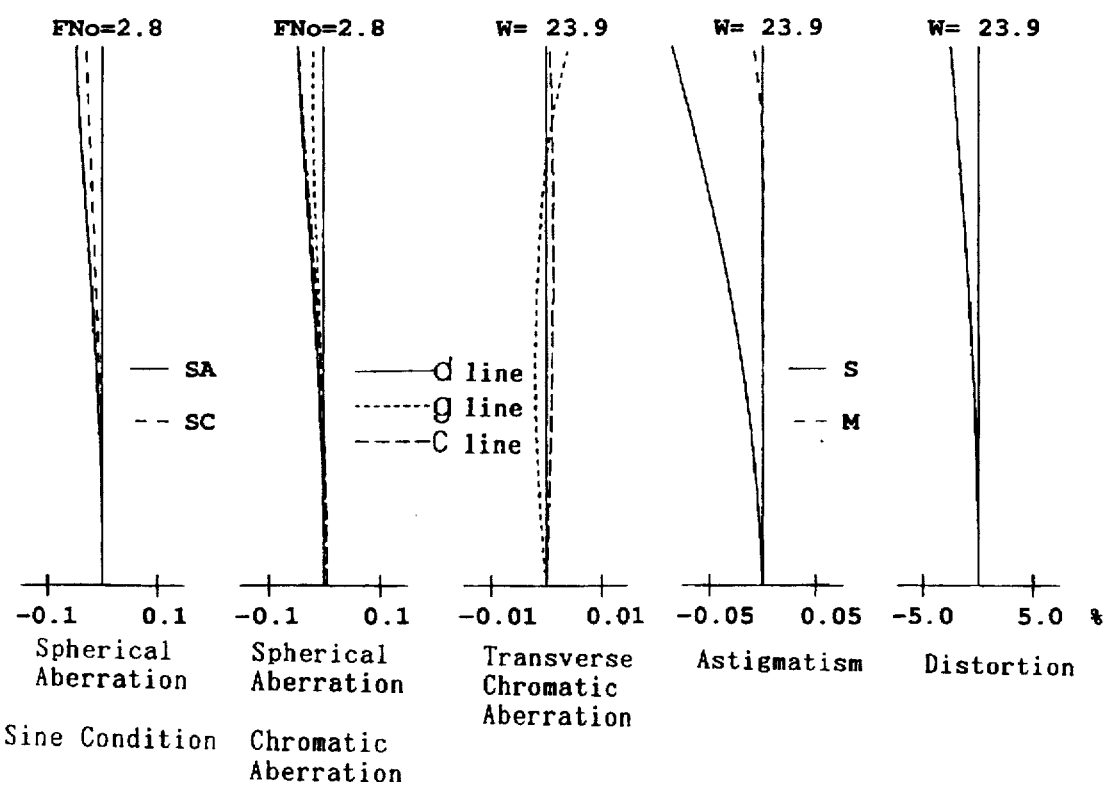

FIG. 9 shows a fifth embodiment of an optical system of a photographing lens according to the present invention. FIGS. 10A through 10E are diagrams of various aberrations in the optical system shown in FIG. 9. Numerical data in the fifth embodiment is shown in Table 5 below.

TABLE 5

$F_{NO} = 1:2.8$
$f = 5.26$
$W = 23.9$
$f_B = 6.11$

| surface No. | R | D | $N_d$ | $v_d$ |
|---|---|---|---|---|
| 1 | 13.058 | 1.20 | 1.78472 | 25.7 |
| 2 | 46.454 | 0.30 | — | — |
| 3 | 3.915 | 0.80 | 1.65160 | 58.5 |
| 4 | 2.200 | 3.00 | — | — |
| diaphragm | ∞ | 1.00 | — | — |
| 5 | −23.713 | 0.90 | 1.72825 | 28.5 |
| 6 | 2.901 | 2.00 | 1.67790 | 53.4 |

TABLE 5-continued $F_{NO} = 1:2.8$
$f = 5.26$
$W = 23.9$
$f_B = 6.11$

| surface No. | R | D | $N_d$ | $v_d$ |
|---|---|---|---|---|
| 7 | −5.046 | 0.10 | — | — |
| 8 | 49.130 | 1.00 | 1.80400 | 46.6 |
| 9 | −8.585 | 3.89 | — | — |
| 10 | ∞ | 3.32 | 1.49782 | 66.8 |
| 11 | ∞ | — | — | — |

Table 6 below shows numerical values of the relationships (1) through (7) for the five embodiments mentioned above.

TABLE 6

| | embodiment 1 | embodiment 2 | embodiment 3 |
|---|---|---|---|
| (1) | −0.494 | −0.636 | −0.269 |
| (2) | 1.110 | 1.131 | 1.016 |
| (3) | 0.547 | 0.400 | 0.420 |
| (4) | 0.477 | 0.477 | 0.477 |
| (5) | 0.268 | 0.383 | 0.227 |
| (6) | 1.697 | 1.773 | 1.652 |
| (7) | 1.847 | 1.805 | 1.805 |

| | embodiment 4 | embodiment 5 |
|---|---|---|
| relationship (1) | −0.650 | −0.263 |
| relationship (2) | 1.444 | 0.761 |
| relationship (3) | 0.345 | 0.437 |
| relationship (4) | 0.575 | 0.418 |
| relationship (5) | 0.402 | 0.231 |
| relationship (6) | 1.773 | 1.652 |
| relationship (7) | 1.805 | 1.728 |

Table 7 below shows the ratio $f_B/f$ of the back focal distance and the focal length of the whole lens system for the five embodiments mentioned above.

TABLE 7

| | $f_B/f$ |
|---|---|
| embodiment 1 | 1.565 |
| embodiment 2 | 1.697 |
| embodiment 3 | 1.282 |
| embodiment 4 | 1.831 |
| embodiment 5 | 1.162 |

As can be seen from Table 6, the first through fifth embodiments satisfy the requirements defined by relationships (1) through (7). Moreover, it can be also found that the back focal distance is longer than the focal length in each embodiment as shown in Table 7.

As may be understood from the above discussion, according to the present invention, a photographing lens whose F-number is approximately 2.8 and which exhibits an optimum optical property for the half angle of view approximately 25° and which has a long back focal distance can be provided.

What is claimed is:

1. A photographing lens comprising a negative first lens group, a diaphragm, and a positive second lens group, in this order from an object side, wherein said photographing lens satisfies the following relationships:

$$-0.7 < f/f_I < -0.2$$

$$0.7 < L/f < 1.5$$

$$0.3 < d/f < 0.6$$

wherein f represents the focal length of the entire optical system of the photographing lens, $f_I$ represents the focal length of the negative first lens group, L represents the distance from the last surface of the negative first lens group to the first surface of the positive second lens group, and d represents the distance from the first surface of the negative first lens group to the last surface of the negative first lens group, and wherein the negative first lens group comprises a positive lens element and a negative lens element, an object-side surface of said positive lens element being a convex surface, arranged in this order from the object side, an image-side surface of said negative lens element being a concave surface, and wherein the negative first lens group satisfies the following relationships:

$$0.3 < r_{I-L}/f < 0.6$$

$$0.15 < f/f_{I-1} < 0.5$$

$$n_{I-2} > 1.6$$

wherein $r_{I-L}$ represents the radius of curvature of the surface of the negative lens element located on the image side, $f_{I-1}$ represents the focal length of the positive lens element, and $n_{I-2}$ represents the refractive index of the negative lens element at the d-line.

2. A photographing lens comprising a negative first lens group, a diaphragm, and a positive second lens group, in this order from an object side, wherein said photographing lens satisfies the following relationships:

$$-0.7 < f/f_I < -0.2$$

$$0.7 < L/f < 1.5$$

$$0.3 < d/f < 0.6$$

wherein f represents the focal length of the entire optical system of the photographing lens, $f_I$ represents the focal length of the negative first lens group, L represents the distance from the last surface of the negative first lens group to the first surface of the positive second lens group, and d represents the distance from the first surface of the negative first lens group to the last surface of the negative first lens group; and wherein the positive second lens group comprises a cemented lens assembly and a biconvex lens, in this order from the object side, said cemented lens assembly comprising a negative lens element and a positive lens element, said positive second lens group satisfying the following relationship:

$$n_{II} > 1.7$$

$n_{II-1}$ represents the refractive index of the negative lens element of the positive second lens group at the d-line.

3. A photographing lens according to claim 2, wherein the negative first lens group comprises a positive lens element, an object-side surface of said positive lens element being a convex surface, and a negative lens element, an image-side surface of said negative lens element being a concave surface, arranged in this order from the object side, and wherein the negative first lens group satisfies the following relationships:

$$0.3 < r_{I-L}/f < 0.6$$

$$0.15 < f/f_{I-1} < 0.5$$

$$n_{I-2} > 1.6$$

wherein $r_{I-L}$ represents the radius of curvature of the surface of the negative lens element located on the image side, $f_{I-1}$ represents the focal length of the positive lens element, and $n_{I-2}$ represents the refractive index of the negative lens element at the d-line.

* * * * *